(12) United States Patent
Bruchmann

(10) Patent No.: US 9,627,829 B2
(45) Date of Patent: Apr. 18, 2017

(54) ADAPTER SYSTEM WITH AN ADAPTER FOR BUSBARS AND AN ADAPTER CONNECTION MODULE

(71) Applicant: Klaus Bruchmann GmbH, Weisskirchen an der Traun (AT)

(72) Inventor: Klaus Bruchmann, Coburg (DE)

(73) Assignee: Klaus Bruchmann GmbH, Weisskirchen an der Traun (AU)

(*) Notice: Subject to any disclaimer, the term of this patent is extended or adjusted under 35 U.S.C. 154(b) by 22 days.

(21) Appl. No.: 14/735,349

(22) Filed: Jun. 10, 2015

(65) Prior Publication Data
US 2015/0357772 A1    Dec. 10, 2015

(30) Foreign Application Priority Data
Jun. 10, 2014 (DE) .................. 10 2014 108 090

(51) Int. Cl.
| H01R 25/00 | (2006.01) |
| H01R 25/14 | (2006.01) |
| H01R 31/06 | (2006.01) |
| H02B 1/21  | (2006.01) |
| H01H 9/16  | (2006.01) |
| H01H 9/28  | (2006.01) |

(52) U.S. Cl.
CPC ......... *H01R 25/142* (2013.01); *H01R 31/065* (2013.01); *H02B 1/21* (2013.01); *H01H 9/16* (2013.01); *H01H 9/281* (2013.01); *H01H 2300/056* (2013.01)

(58) Field of Classification Search
CPC .... H01R 25/142; H01R 31/065; H01R 25/14; H01R 9/2608; H01R 9/2691; H01R 25/145; H01R 4/48; H01R 4/4818
USPC ........ 439/122, 121, 251, 441, 835, 834, 110
See application file for complete search history.

(56) References Cited

U.S. PATENT DOCUMENTS

| 6,464,545 B2 * | 10/2002 | Yano ................. H01R 9/26 439/441 |
| 7,448,885 B2 * | 11/2008 | Wagener ............ H02B 1/21 439/116 |
| 7,601,013 B2 * | 10/2009 | Wagener ............ H02B 1/21 439/110 |
| 2011/0065295 A1 * | 3/2011 | Buettner ........... H01R 31/06 439/121 |
| 2015/0093925 A1 * | 4/2015 | Bruchmann ...... H01R 13/62933 439/153 |

FOREIGN PATENT DOCUMENTS

| DE | 102005009856.8 A1 | 9/2006 |
| DE | 102013110789.3 B3 | 4/2014 |

\* cited by examiner

*Primary Examiner* — Hae Moon Hyeon
(74) *Attorney, Agent, or Firm* — Wood, Phillips, Katz, Clark & Mortimer

(57) ABSTRACT

The present invention relates to an adapter system for busbars, having an adapter for busbars and an adapter connection module, which can be connected together to provide an operating position of the adapter system. The adapter for busbars has contact connections, a housing and a cable connection arrangement, the adapter connection module has a housing, an interruptible bridge circuit, a primary switch and an activation lever for actuating a lever switch of the adapter for busbars.

17 Claims, 16 Drawing Sheets

ADAPTER SYSTEM WITH AN ADAPTER FOR BUSBARS AND AN ADAPTER CONNECTION MODULE

FIELD OF THE INVENTION

The present invention relates to busbar adapters, by means of which electrical devices, especially electrical installation devices, can be attached to a busbar system. Such busbar adapters are particularly suitable for electrical busbar systems, in particular for 3-phase busbar systems, and in particular for attaching safety fuse systems, circuit breaker units etc., but also for all other electrical installation devices.

BACKGROUND OF THE INVENTION

The contacting of such busbar adapters is effected for example via a multi-pole connection cable, that has a plurality of conductors (or poles). For example, a 3-phase connection cable has a single conductor for each phase, wherein in the known systems each conductor is individually attached to the corresponding cable connection. For this purpose screw connections, soldered or welded joints are used, for example. Such a busbar adapter is known from document DE 10 2005 009 356 A1, for example.

Building upon this prior art it is an object of the present invention to provide a busbar adapter, which enables both simple and convenient handling for the user and a secure connection of consumers, while simultaneously satisfying high safety requirements.

BRIEF SUMMARY OF THE INVENTION

This object is achieved by means of an adapter system for busbars in accordance with claim 1 or, in accordance with an alternative solution, by means of an adapter system for busbars in accordance with claim 2, each of which comprises an adapter for busbars and an adapter connection module, wherein the adapter for busbars and the adapter connection module can be connected together to provide an operating position of the adapter system.

The claims 3 to 17 relate in particular to advantageous configurations of the adapter system for busbars according to the invention in accordance with claim 1 and/or in accordance with claim 2.

In accordance with a first aspect of the invention the adapter system comprises an adapter for busbars with at least two contact connections for connecting the adapter to a busbar system, a housing with at least two openings for receiving one pole each of a multi-pole connection device, and a cable connection arrangement.

The cable connection arrangement, which is arranged in the housing of the adapter, comprises a spring clamp structure and a lever switch. The spring clamp structure and the spring holder are designed such that the spring clamp structure exerts a spring force, which both pre-tensions the lever switch into an on position and also exerts a force on all poles of a multi-pole connection device which are inserted, wherein characteristically and preferably 3-pole connection devices are used. This leads to a situation whereby the inserted poles cannot be removed from the cable connection arrangement if the lever switch is in its on position. This is achieved in particular firstly by the spring force exerted by the spring clamp structure, and secondly by the geometric arrangement of the spring clamp structure, which prevents removal of the inserted poles.

However, the lever switch can be moved by the user from its on position into an activation position against the spring force exerted by the spring clamp structure, so that in the activation position of the lever switch ail inserted poles of the multi-pole connection device can be removed from the cable connection arrangement.

A particularly advantageous arrangement of such an adapter for busbars is also described in the parallel patent application by the same applicant, official document number of the German Patent and Trademark Office DE 10 2013 110 789.3.

In accordance with a first aspect of the invention, the adapter system for busbars also comprises an adapter connection module with a housing, from which at least two poles of an adapter-side connection device protrude for introducing into the at least two openings of the housing of the adapter for busbars, and which has at least a 2-pole, preferably 3-pole, consumer-side connection device for connecting one or more electrical consumers. The adapter-side connection device is connected via an interruptible bridge circuit to the consumer-side connection device.

The adapter connection module further comprises a primary switch that can be toggled between an on position and an off position, and an activation lever for activating the lever switch of the adapter for busbars.

The interruptible bridge circuit is in its on position when the primary switch is in the on position, and the bridge circuit is in is disconnected position when the primary switch is in its off position.

In accordance with a first aspect of the invention, on at least on of its component parts the primary switch comprises an opening that is arranged and designed such that the activation lever can be forced into the housing of the adapter connection module by means of a tool which can be introduced through this opening on the primary switch or components of the primary switch, into its activated position, when the primary switch is in its off position. The opening of the primary switch, or on the component of the primary switch respectively, is sealed off by other elements or components of the adapter connection module when the primary switch is in its on position or when it is not in its off position. This results in the fact that a tool cannot be inserted into the housing in order to move or to force the activation lever into its activation position.

An adapter system in accordance with a first aspect of the invention has manifold advantages: due to the preferred arrangement of the adapter for busbars, in particular due to the particularly advantageous configuration of the spring clamp structure and of the lever switch, by the activation of a single element, namely the lever switch, it is possible to insert all poles of a multi-pole connection device simultaneously into the cable connection arrangement, and by releasing the lever switch to produce the electrical contact. In particular, by actuating the lever switch alone it is possible to release all poles of the multi-pole connection device, so that these can be completely removed, while preferably, due to the geometric configuration of the elements, insertion of the connection device is possible even without activation of the lever switch. This facilitates the operation of the adapter for busbars by the user and simultaneously ensures that operating errors are avoided.

The provision of the adapter connection module according to the invention, that is used in common with an adapter for busbars in order to provide the adapter system according to the invention, leads to further advantages that directly interact with the advantages already described above. Firstly the connection of an adapter connection module to the adapter for busbars, due to the fact that it involves a single complete component, is very advantageous and simple for the user. Secondly, by the provision of a single activation lever for actuating the lever switch of the adapter for busbars, an entire system is provided that is very simple for the user to operate, so that the entire system can also be assembled and dismantled by the activation of a single element, namely the activation lever of the adapter connection module.

By activating the activation lever therefore, preferably by pressing on the activation lever, and using a tool which can be introduced through an opening of the primary switch into the housing of the adapter connection module, the user can directly or indirectly activate the lever switch of the adapter for busbars and either force or press it into the activation position, so that all poles of the adapter-side connection device of the adapter connection module can thereby be released together.

In accordance with a first aspect, the invention ensures at the same time that the activation lever is possible only by introduction of a tool through the opening provided on a component of the primary switch, which is in turn enabled only when the primary switch is in its off position, wherein the opening of the primary switch is closed off in such a manner that no tool can be introduced if the primary switch is in its on position. Accidental release of the poles of the adapter-side connection device from the spring clamp structure of the adapter for busbars during operation of the system is therefore reliably prevented.

Furthermore, in accordance with a first aspect the adapter system according to the invention also guarantees that in the cases where the activation lever can be forced into its activated position by the user by means of a tool, the interruptible bridge circuit is already in its disconnected condition, so that even before a possible activation of the activation lever the consumers are safely disconnected from the busbar system and are therefore at zero power. This ensures on the one hand that no operating errors take place, which furthermore represents high safety levels for the user. In addition, this prevents any arcing from occurring at the poles and/or the spring clamp structure, because at the moment of disconnection of the adapter-side connection device from the spring clamp structure the latter is already at zero power.

A controlled separation of the connection or the contacts is therefore effected in advance by the controlled movement of the bridge circuit into its disconnected state, which is in turn caused by the movement of the primary switch into its off position.

The entire system according to the invention with an adapter for busbars on the one hand and with an adapter connection module on the other hand, therefore provides a system which is very simple to handle, in which all processes are carried out in a controlled manner avoiding any arc formation, while any operating errors by the user are also reliably prevented.

In accordance with a second independent aspect of the invention, which is defined in claim 2, the possibility also exists of providing an adapter for busbars and an adapter connection module and an adapter system as described above, but in which it is not obligatory to provide an opening on a component of the primary switch, so that the activation lever can be forced into its activation position by means of a tool that can be introduced into the housing of the adapter connection module through this opening of the primary switch. Instead (or alternatively and also in addition), the primary switch can be coupled to the activation lever in such a manner that the primary switch automatically presses the activation lever into its activation position when said lever is rotated through a specific angle beyond its off position and into an assembled position.

It is therefore possible, for example, to design the adapter system and in particular the adapter connection module, such that a primary switch can preferably be rotated through a first angle alpha so that it can be moved back and forth between its on position and its off position, while the primary switch can preferably be turned through an additional angle β beyond the off position into its assembled position, wherein only when this movement of the primary switch from its off position into an assembled position occurs is the activation lever automatically forced into its activation position.

Such a configuration, which represents a second alternative and therefore also an independent inventive aspect, enables the user to force the activation lever into the activation position without using an additional tool. Nevertheless, if an opening is additionally provided in a component of the primary switch and/or of the adapter connection module (similarly to what has been described above with regard to a possible configuration), which enables the introduction of a tool in an off position, the user can also choose whether he forces the activation lever into the activation position using a tool when the primary switch is in its off position, or alternatively rotates the primary switch through an additional angle instead, so that by this further rotation, or alternatively also by some other movement of the primary switch, for example a pressing of the primary switch, which is possible only in the off position, the activation lever is respectively pressed or forced into its activation position.

In accordance with a preferred embodiment, the primary switch is rotatable between its on position and its off position, in particular through a predefined angle. Such a rotation can be easily carried out by the user, which ensures controlled switching on and switching off processes, and furthermore a rotary switch is intuitively advantageous for the user. A predefined angle, preferably for example between 60° and 120°, particularly preferably between 80° and 100°, furthermore ensures that the movement of the primary switch can be carried out by the user easily and with a single hand movement, without needing to take hold of it, for example.

The activation lever of the adapter connection module can preferably be moved between an activation position and an operational position by a predefined distance in its longitudinal direction. This ensures that force is transmitted onto the lever switch of the adapter for busbars in a particularly efficient manner. At the same time the activation lever is preferably designed and aligned such that its direction of motion is aligned in such a manner that when the user inserts a tool through the opening of the primary switch housing, he only needs to press it on an upper part of the activation lever, accessible through the opening, so that the force exerted by the user is transferred in an efficient manner.

It is preferably also provided that at the point at which a tool can make contact, the activation lever is designed such that the tool, for example a screwdriver or an Imbus key or other similar element, is firmly held, for example by a recess being provided on the top side of the activation lever, the shape of which preferably matches the tool to be used.

The adapter connection module preferably comprises one fuse holder per pole for receiving safety fuses, wherein three fuse holders are preferably provided for 3-pole systems. These fuse holders are preferably movable between an operating position and a removal position, so that in a removal position a fuse can be removed from the fuse holder by the user, for example when a fuse needs to be replaced.

The fuse holders can therefore be preferably provided for example in the form of a kind of drawer, that can be preferably pulled out of the housing of the adapter connection module. This enables particularly simple maintenance of the adapter system and a simple means for checking whether, for example, the correct fuses are being used, or, for example, a fuse is defective.

In accordance with a further preferred embodiment, the adapter connection module additionally comprises a locking device for fuse holders, which is coupled to the primary switch such that the locking device prevents movement of any of the fuse holders from their operating position towards the removal position when the primary switch is in its on position. This ensures that the fuse holders cannot be accidentally removed from their operating position when the system is in operation, because, these can result in unintended arcing and disruptions of the system. This measure also prevents a possible danger to the user.

The primary switch and the locking device are preferably coupled such that a rotation of the primary switch is transformed into a linear or substantially linear movement of the locking device. This has the advantage that a substantially planar element can be used, which is pushed in front of at least some parts of the fuse holder when the primary switch is in its operating position. This linear displacement of the elements of the locking device saves a great deal of space, which is very useful in the somewhat cramped conditions in which an adapter system must be installed. This also prevents parts of the locking device from being accidentally broken off, because all elements of the locking device can be guided closely along the housing of the adapter connection module.

In accordance with a further preferred embodiment, the primary switch comprises a movable control element that is moved between the on position and the off position, wherein this movable control element, preferably a rotary operating element, comprises one or more openings which either in the on position or in the off position or both in the on position and in the off position are aligned with corresponding openings of the adapter connection module, such that the control element can be locked in the on position and/or in the off position by means of a lock, device. This guarantees that a desired operating condition, namely a switched on condition or a switched off condition, is established and cannot be accidentally changed by a user. In particular, for example in the case of defective devices or even consumers, the entire system can therefore be locked in the off position, for example.

In a particularly preferred embodiment, the adapter connection module additionally comprises a transmission element which is attached to a part of the adapter connection module in a movable, preferably rotary, manner. This has the advantage that the activation element forces the lever switch of the adapter for busbars into its activation position indirectly via the transmission element, and the force is transferred in a particularly efficient manner.

The transmission element is preferably only rotatable through a specified angle, so that for example the transmission element can be retained in the housing of the adapter connection module, or the path over which the transmission element can move is restricted, as appropriate. This also means, for example, that the transmission element can be easily prevented from slipping out of the housing, even if it is not attached elsewhere, so that additional attachment elements or limiting elements are not required.

The connection module preferably comprises additional devices, such as an electronic power supply, a measurement device for measuring operating conditions of the system, for example voltage, current strength, power, hours of operation etc., a microprocessor for controlling and monitoring the system, a display device to display relevant information to the user, a control panel so that certain inputs can be provided by the user, a switching unit, for example a contactor, a relay etc., and one or more input and output units, for example a bus connection, to name just a few examples.

In accordance with a particularly preferred embodiment of the invention in accordance with the second aspect, an actuating cam is also provided, which is designed such that the activation lever of the adapter connection module is forced directly or indirectly by this into its activation position, if the primary switch is in its assembled position. This actuating cam is preferably arranged directly on a component of the primary switch.

In a further preferred embodiment of the invention in accordance with the second aspect, the device also comprises a locking device that is adjustable between a locked position and an assembled position. This means it can be guaranteed that without an activation of the locking device and without forcing the locking device into its assembled position, the primary switch can only be moved between its on position and its off position, in order to prevent an accidental release, or also only partial release, of the adapter connection module.

In accordance with a preferred embodiment, such a locking device also comprises a spring device which is designed such that the lacking device is pre-tensioned in its locked position.

An adapter system in accordance with the second aspect of the invention preferably also comprises an opening, into which a tool can be introduced, at least when the primary switch is in its off position, so that the locking device can be forced into its assembled position by means of this tool.

BRIEF DESCRIPTION OF THE DRAWINGS

These and other advantages and features of the invention will foe further clarified on the basis of the enclosed drawings, that show particularly advantageous embodiments of the adapter system or parts of the adapter system according to the invention, wherein FIGS. 1 to 10 refer in particular to an embodiment in accordance with a first aspect of the invention, while FIGS. 11 to 14 refer in particular to an embodiment in accordance with the second aspect of the invention. These show.

DETAILED DESCRIPTION OF THE PREFERRED EMBODIMENTS

Figure 1:
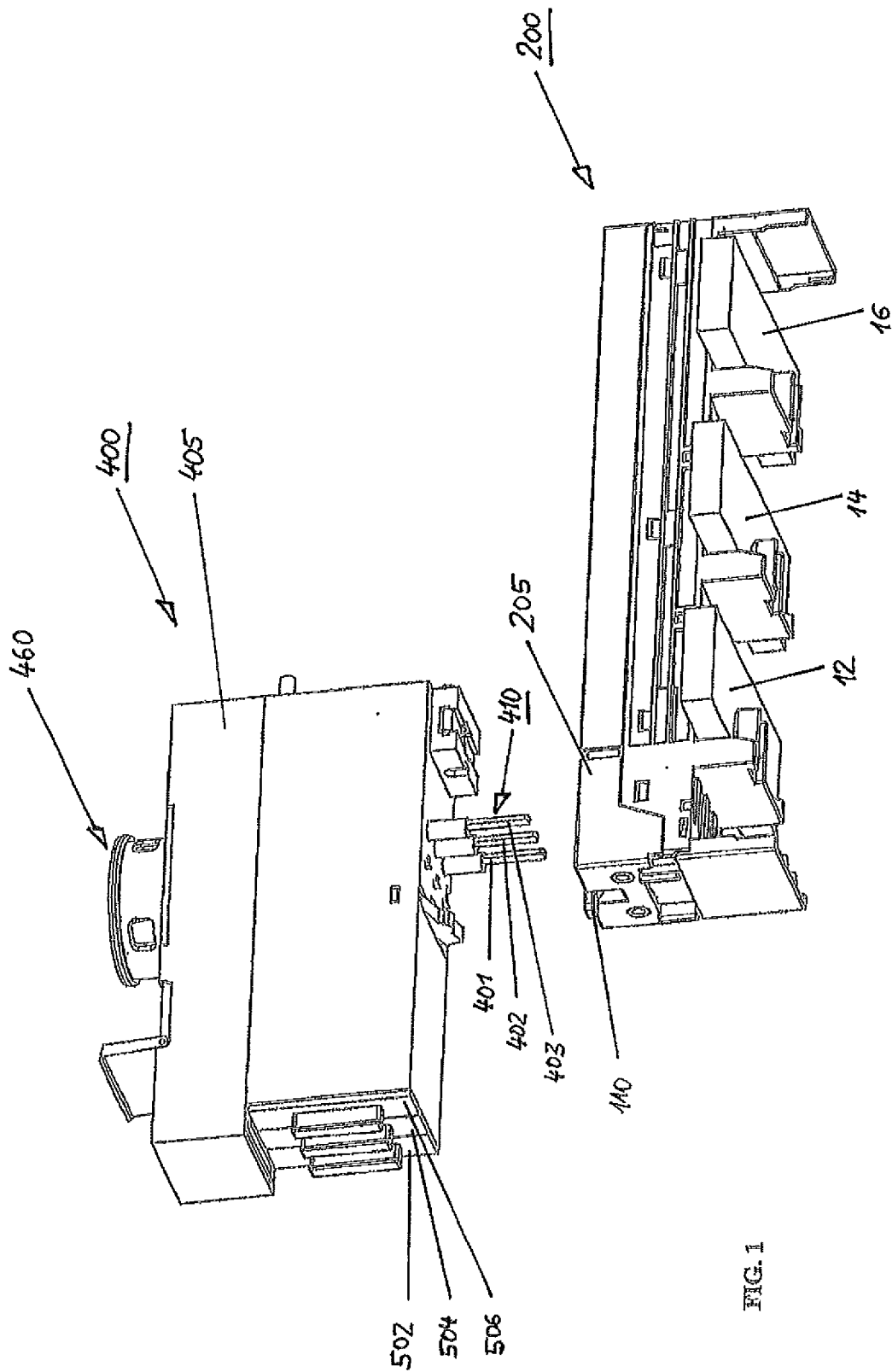
FIG. 1 a perspective view of an embodiment of an adapter for busbars and an adapter connection module in the disassembled condition.

FIG. 1 shows in a perspective view an embodiment of an adapter system according to the invention for busbars, which comprises an adapter 200 for busbars and an adapter connection module 400 that can be connected together to provide an operating position of the adapter system, but which are shown in FIG. 1 in a non-connected condition in order to clearly illustrate the individual components.

The adapter 200 for busbars 12, 14, 16 comprises a housing 205, in which openings (not visible in FIG. 1, as they are arranged on the top) are provided so that poles 401, 402, 403 of an adapter-side connection device 410 of the adapter connection nodule 400 can be inserted.

The Adapter 200 for busbars also comprises a lever switch 110, which in FIG. 1 must be pressed downwards, so that inserted poles 401, 402, 403 of the connection device 410 of the adapter connection module 400 can foe removed, if these are used. This function and the associated elements will now be explained in more detail in the following drawings.

FIG. 1 also shows the adapter connection module 400, which has a housing 405, into which the fuse holders 502, 504, 506 for receiving fuses are inserted, and which can be extracted to remove fuses, in FIG. 1 to the left.

On a top side of the housing 405 of the adapter connection module 400, a primary switch 460 is provided.

Figure 2:
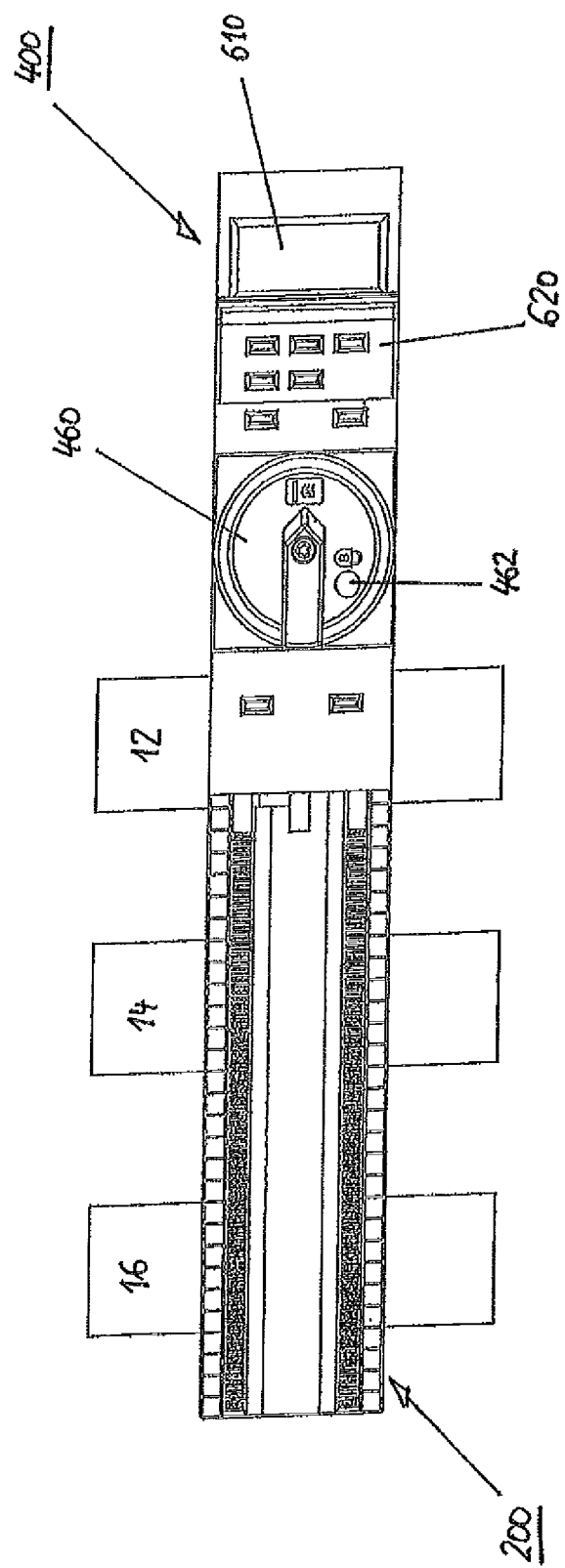
FIG. 2 a plan view of an embodiment of an adapter system, wherein the primary switch is in its on position.

FIG. 2 shows a plan view of an embodiment of an adapter system wherein the adapter connection module 400 is mounted onto the adapter 200 for busbars.

The primary switch 460 is in its on position, so that an opening 462 in a component of the primary switch is closed off by other elements of the adapter connection module 400, so that it is not possible to introduce a tool into the housing 405 of the adapter connection module through the (closed) opening 462. The elements of the primary switch will be shown and explained in further detail, in particular in connection with FIGS. 8 and 9.

As is evident in FIG. 2, the adapter connection module, in particular the adapter system, can comprise additional functional elements, for example a display device 610, that is capable of indicating certain operational values of the device, or a control panel 620 with which the user can control the adapter system.

Figure 3:
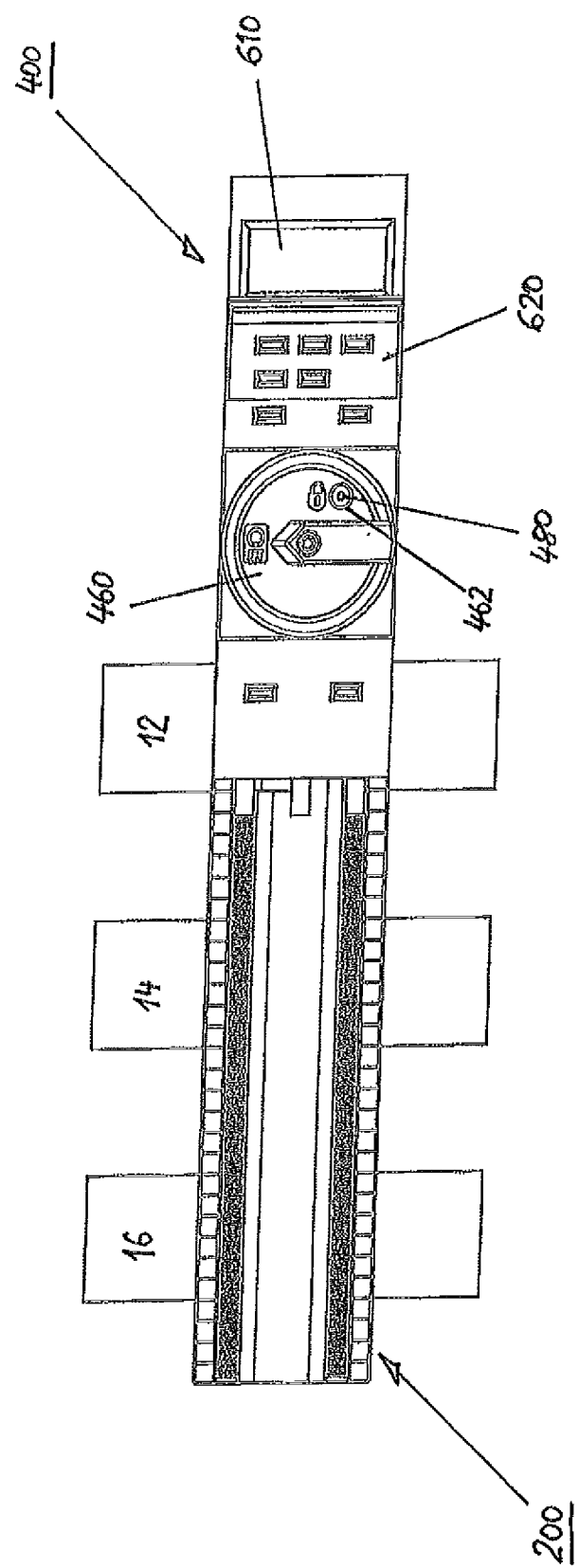
FIG. 3 a plan view of an embodiment of an adapter system, wherein the primary switch is in its off position.

FIG. 3 shows a plan view of the adapter system shown in FIG. 2, but wherein the primary switch 460 is in its off position.

The opening 462 in a component of the primary switch 460 in the off position of the primary switch 460 is aligned with another opening in the housing 405 of the adapter connection module, so that a tool, for example a screwdriver, can be introduced into the housing 405 of the adapter connection module 400 through the opening 462, so that an activation lever 480, which is visible through the opening 462, can be actuated and can be forced into its activation position by, for example, the screwdriver or another tool being pressed onto the activation lever 480.

Figure 4:
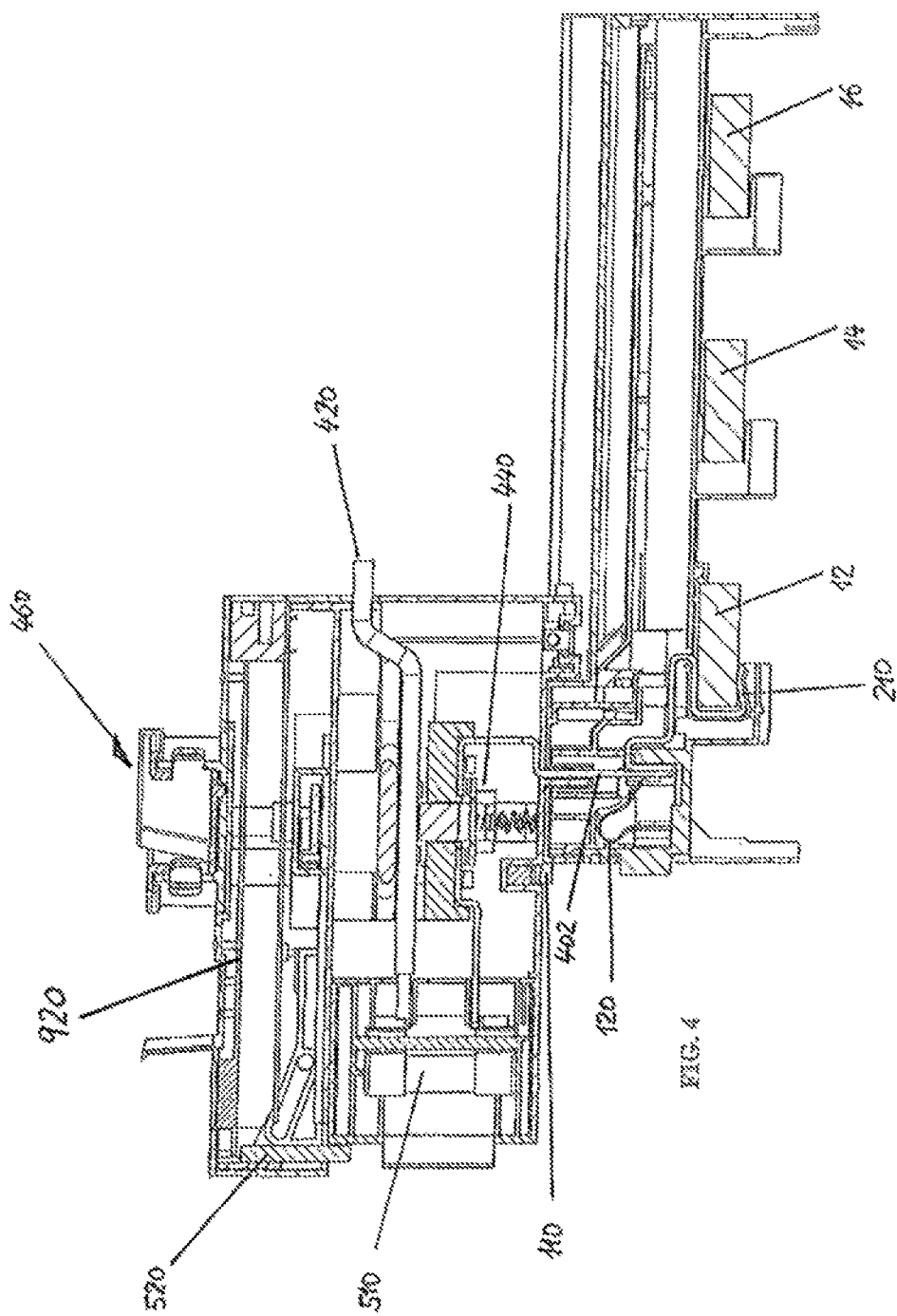
FIG. 4 a cross-section through an embodiment of an adapter system according to the invention, in which the primary switch is in its on position.

FIG. 4 shows a cross-section through an adapter system according to the invention, in which the primary switch 460 is in its on position. In this on position of the primary switch 460, the bridge circuit 440 is also in its on position, so that the adapter-side connection device (in FIG. 4 a contact element 402 of this adapter-side connection device can be seen) is connected via the bridge circuit 440 and via fuses 510 to a consumer-side connection device 420. As can further be seen in FIGS. 4 and 6, the connection module includes a measurement device 920 in the form of a circuit board assembled within the housing 405 beneath the control panel 620 (FIG. 14) for measuring operating conditions of the system, for example voltage, current strength, power, hours of operation etc.

As is also clearly evident in FIG. 4, the lever switch 110 of the adapter 200 is in an on position, so that a spring of the spring clamp structure 120 presses the contact element 402 against parts of the contact connection 210, so that the entire adapter system is in its operating position.

As a result of the spring force of the spring clamp structure 120 and of the geometric arrangement or the spring elements of the spring clamp structure 120, which is arranged in its contact area at an angle to the contact element 402 such that extracting the contact element 402 would cause the corresponding spring element to bend upwards and become wedged or clamped to the contact element 402, it is not possible to extract the contact element 402 or the adapter connection module as long as the lever switch 110 of the adapter 200 is in its on position.

FIG. 4 also shows a locking device 520, that is arranged (partially) in front of the fuse holders 502, so that the fuse holders 502 cannot be opened, in FIG. 4 shifted to the left, as long as the primary switch is in its on position.

FIG. shows 5 a perspective view of some parts of the adapter system according to the invention, wherein the primary switch 460 is in its on position, as was also explained in connection with FIG. 4, so that the bridge circuit is also in its on position (or also contact position).

Figure 5:
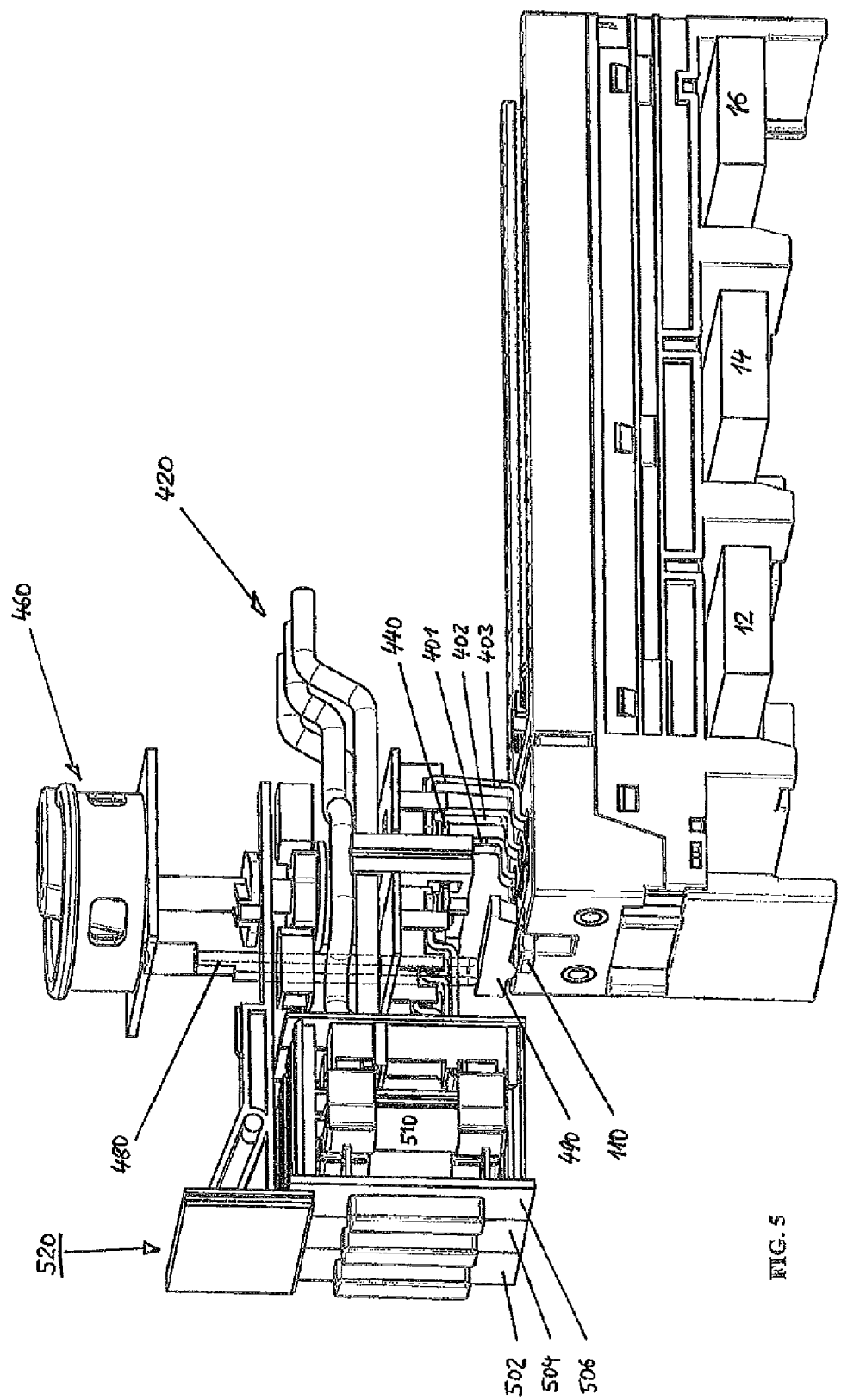
FIG. 5 a perspective view of some parts of an adapter system according to the invention, wherein the primary switch is in its on position.

FIG. 5 shows very clearly the activation lever 480, which is in an operating position and contacts a transmission element 490 that is also in an operating position and contacts the lever switch 110 of the adapter 200 but does not apply a force thereto, so that the lever switch 110 is in its on position.

The locking device 520 is in its locking position, in FIG. 5 in a lower position, wherein this position is secured by a coupling to the primary switch 460.

Figure 6:
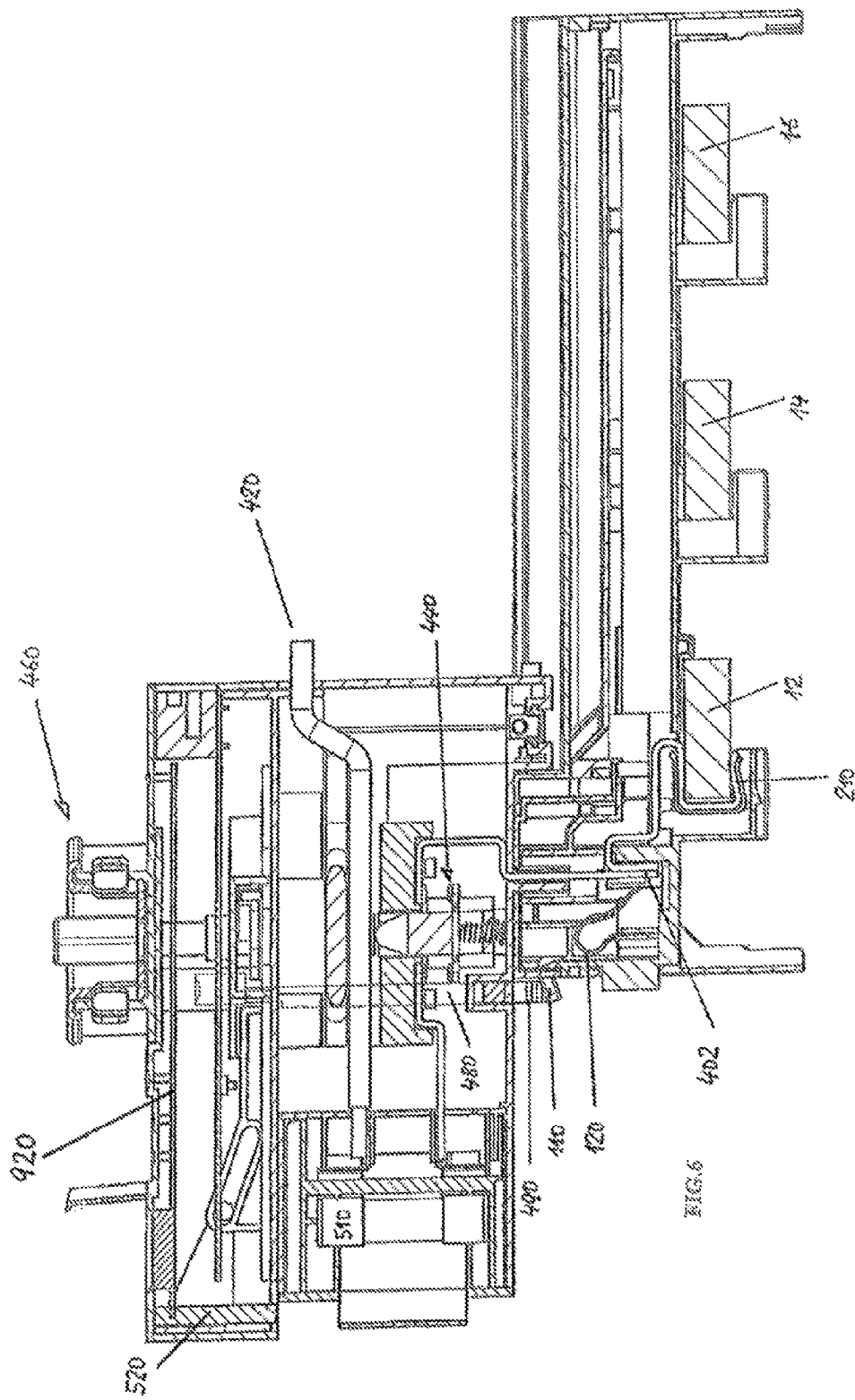
FIG. 6 a cross-section through an embodiment of an adapter system according to the invention, in which the primary switch is in its off position and the activation lever is in its activation position.

FIG. 6 shows a cross-section through an embodiment of an adapter system according to the invention, similarly to that in FIG. 4 in which the primary switch 460 in FIG. 6 is in its off position, wherein for this purpose the primary switch 460 in this embodiment has been rotated by 90°.

Based on the coupling of the primary switch 460 with the locking device 520, the locking device 520 has been displaced, in FIG. 6 upwards, so that the locking device 520 is no longer located in front of the fuse holders 506, so that it would be possible to extract the fuse holders 506 (and the other fuse holders that are not shown in this figure), in FIG. 6 to the left, so that the fuses 510 can be removed.

Furthermore, by movement of the primary switch 460 into the off position the bridge circuit 440 is automatically broken, so that the adapter connection module is under zero power so that the fuses can also be safely removed without causing electrical arcing.

When the primary switch 460 is in its off position, a tool (not shown) can, as described in connection with FIG. 3, be introduced into the housing 405 of the adapter connection module 400, so that the activation lever 480 can be pressed, in FIG. 6 downwards, into its activation position, so that it exercises a force on the transmission element 490, so that the transmission element is also forced into its activation position, wherein the transmission element 490 also presses the lever switch 110, in FIG. 6 downwards, into its activation position, as shown in FIG. 6.

By pressing the lever switch 110 downwards into its activation position, a force is exerted on the spring elements of the spring clamp structure 120 so that these are pushed away from the contact element 402, so that there is no longer any contact between the spring clamp structure 120 and the adapter-side connection device either.

Due to this configuration according to the invention it is therefore possible for example that in a first step, if the primary switch 460 is moved from its on position into its off position, the bridge circuit is interrupted automatically so that the system is switched off in a controlled manner without the occurrence of electrical arcing.

Only after that is it possible, for example, to remove the fuse holders in order for example to replace fuses or test them, or by means of a tool, to press or to force the activation lever 480 and therefore also the lever switch 110 (and, as in this embodiment, also the transmission element 490) into the activation position, in FIG. 6 downwards.

A release of the adapter connection module 400 of the adapter 200 is therefore very easily possible for the user, since by a single activation process, introducing a tool into the housing, as described above, exerts a force on a single element, namely the activation lever 480, which again causes a single element of the module, namely the lever switch 110, to be forced into its activation position, whereby all poles simultaneously and on the activation of a single element are "released", so that the adapter connection module 400 can then be removed easily and without operating errors and in particular without causing damage to individual contacts.

Figure 7:
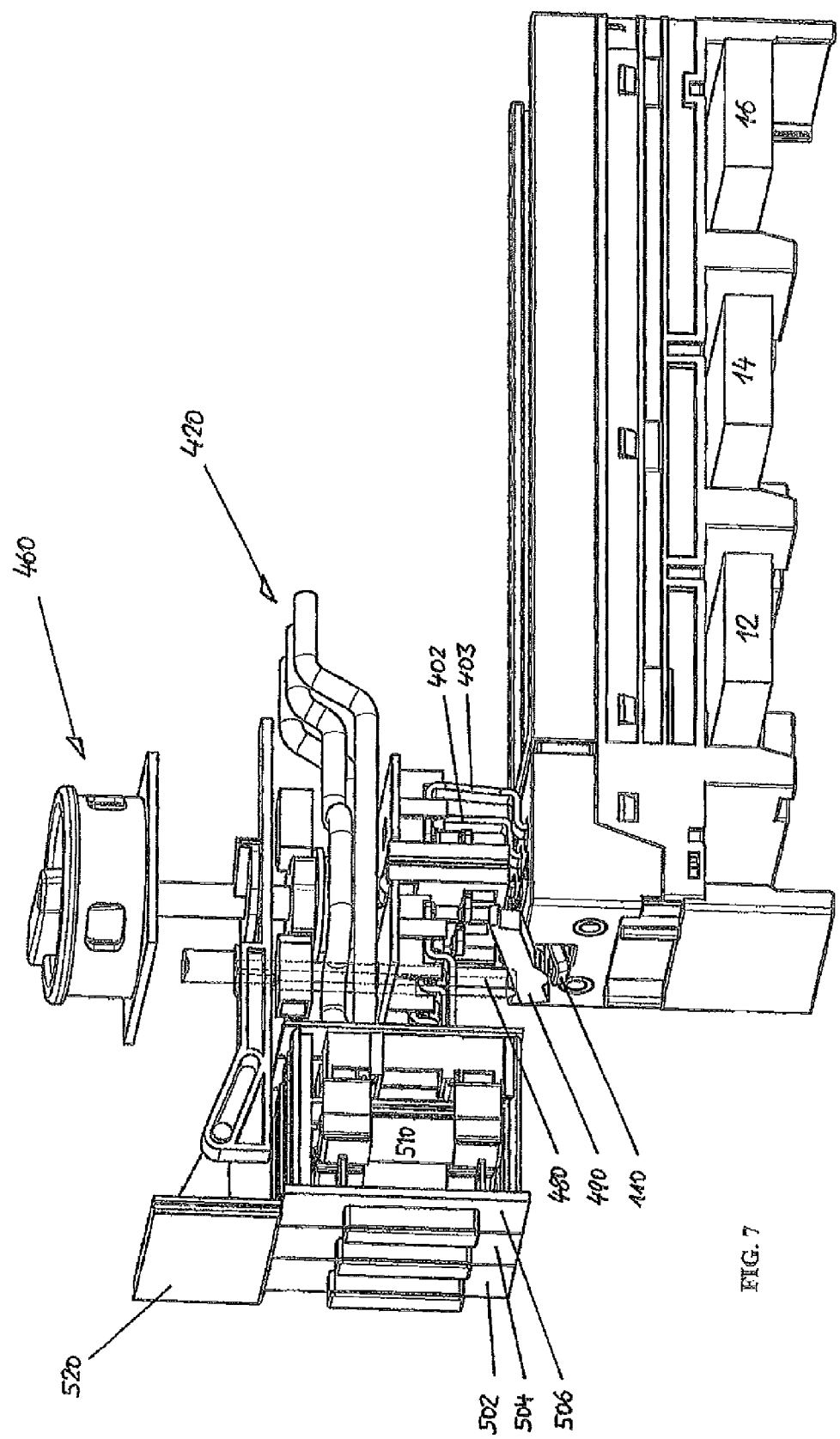
FIG. 7 a perspective view of some parts of an adapter system according to the invention, wherein the primary switch is in its off position and the activation lever is in its activation position.

FIG. 7 shows a perspective view of some elements of an adapter system according to the invention, in which the primary switch 460 is in its off position and the activation lever 480 is pressed into its activation position, as shown in connection with FIG. 6.

The activation lever 480 has been pressed by a tool (not shown) into an activation position, in FIG. 7 in a downward direction, so that the transmission element 490 is also pressed into its activation position, wherein the transmission element 490 is rotatably mounted on the housing 405 of the adapter connection module, so that it is rotated through a pre-specified angle.

The transmission element 490 transmits the force exerted on the activation lever 480 onto the lever switch 110, as explained in connection with FIG. 6, so that all poles of the adapter-side connection device are no longer held in place and the connection module 400 can be removed from the adapter 200.

Figure 8:
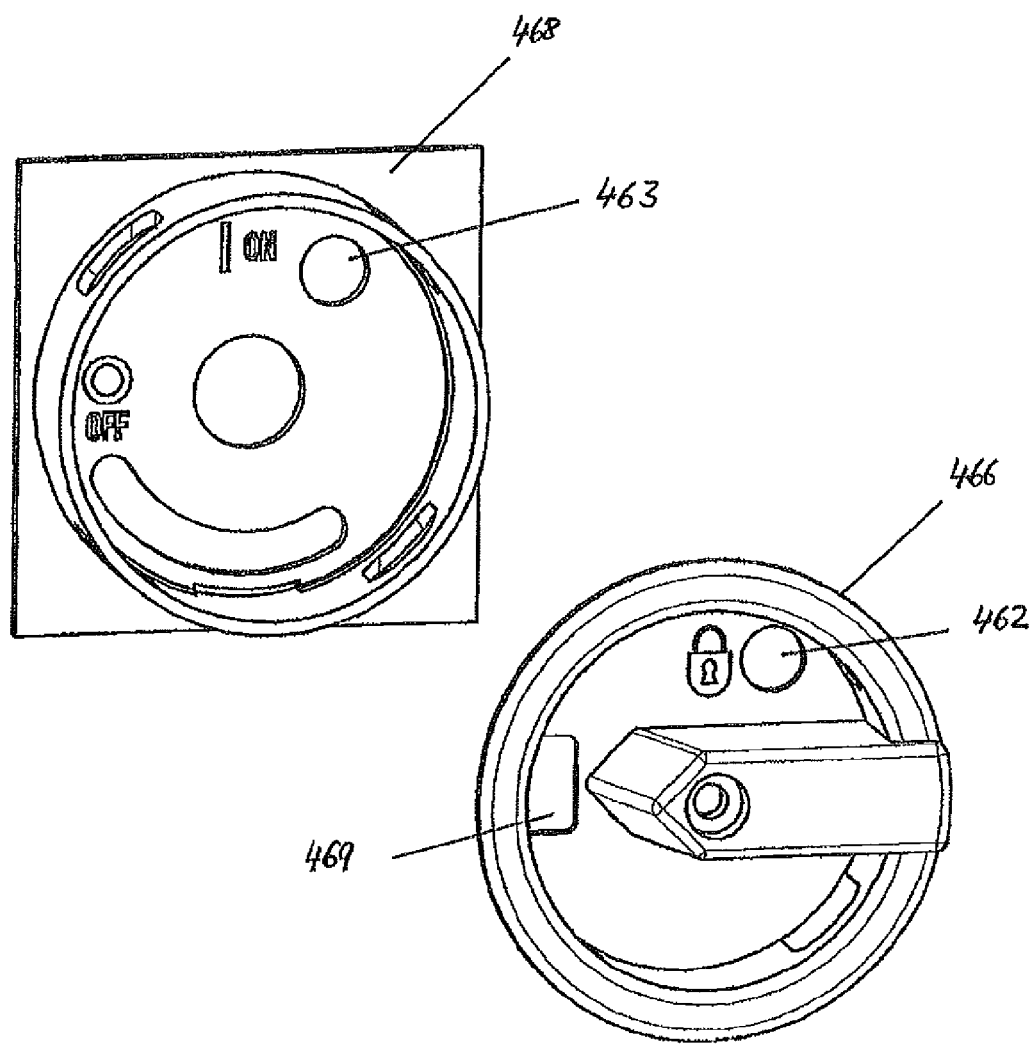
FIG. 8 a perspective view of components of an embodiment of a primary switch of an adapter connection module according to the invention.

FIG. 8 shows components of a primary switch 460, which comprises a control element 466 that can rotate relative to the housing 405 of the adapter connection module 400, in this embodiment through an angle of 90°, and a fixed component 468, that cannot rotate relative to the housing 405 of the adapter connection module.

The rotatable control element 466 has an opening 462, as already described above.

In the position shown in FIG. 8 this opening 462 of the rotatable control element 466 is aligned with an opening 463 in the fixed component 468 of the primary switch 460, so that, as already described above, a tool can be introduced through the opening 462 and through the opening 463 into the housing of the adapter connection module to activate the activation element.

The rotatable control element 466 of the primary switch 460 comprises a further opening or window 469, through which, according to the position of the control element, labels on the fixed component 468 of the primary switch 460 are visible. In the off position, the label "OFF" is visible.

When the control element 466 is turned into its on position, in FIG. 8 in the clockwise direction by 90°, the opening 462 is no longer aligned with the opening 463, so that no tool can be introduced into the housing of the adapter connection element.

The opening or the window 469 is then positioned such that the label "ON" is visible on the fixed component 468 of the primary switch 460.

Figure 9:
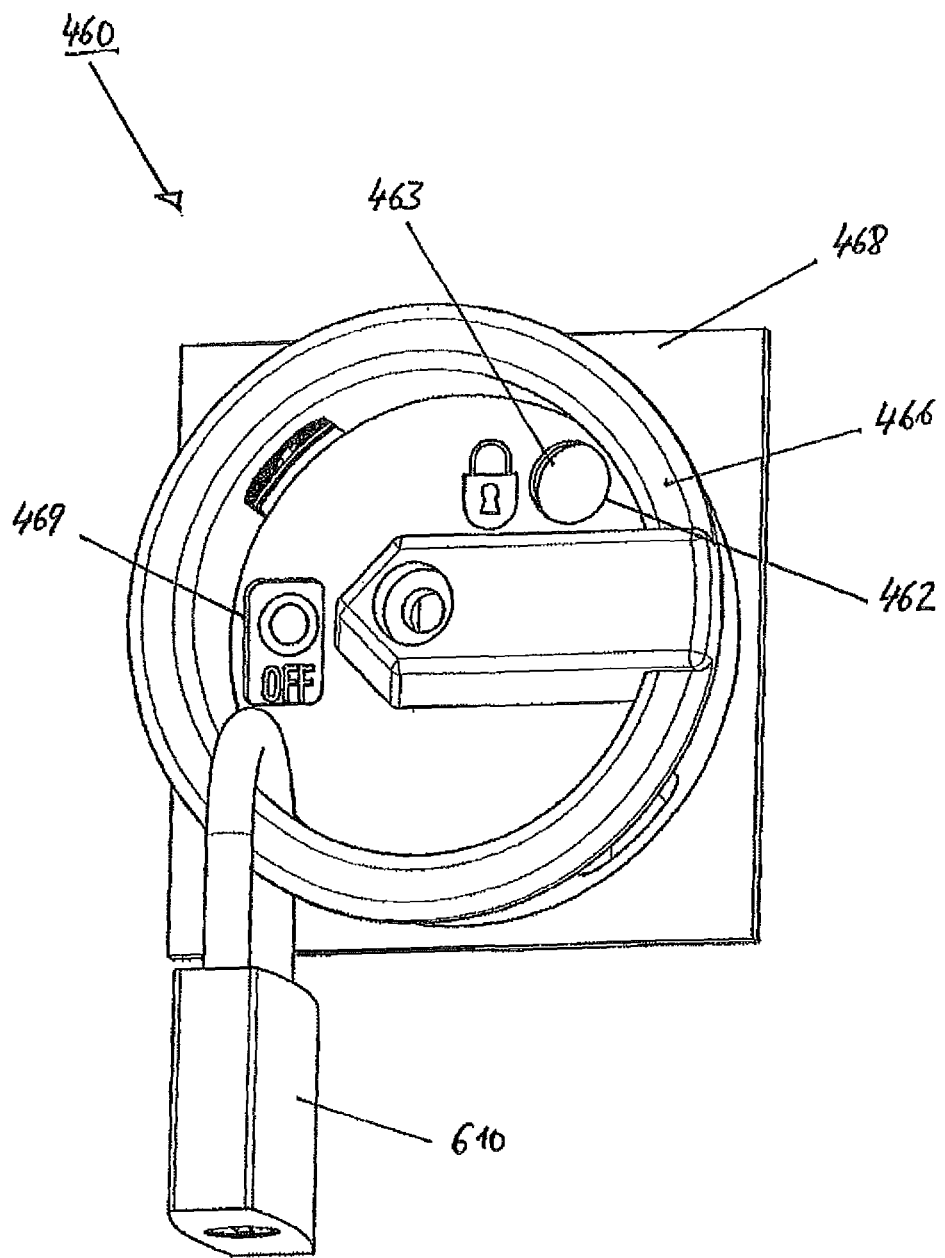
FIG. 9 the components of a primary switch shown in FIG. 8 in an assembled configuration and in the off position of the primary switch.

FIG. 9 shows the primary switch 460, with both elements 466 and 468 as described above, but in the assembled condition, wherein the primary switch 460 is in its off position, so that the openings 462 and 463 are aligned and a tool can be introduced through these openings 462, 463. In addition, the opening or the window 469 is positioned such that the label "OFF" is visible.

Furthermore, in the side areas of the elements 466 and 468 of the primary switch 460, further openings are located which are aligned with each other and into which, as shown in FIG. 9, a lock 610 can be inserted, so that the primary switch 460 can be locked in its off position and cannot be moved into its on position without removal of the lock 610.

Figure 10A:
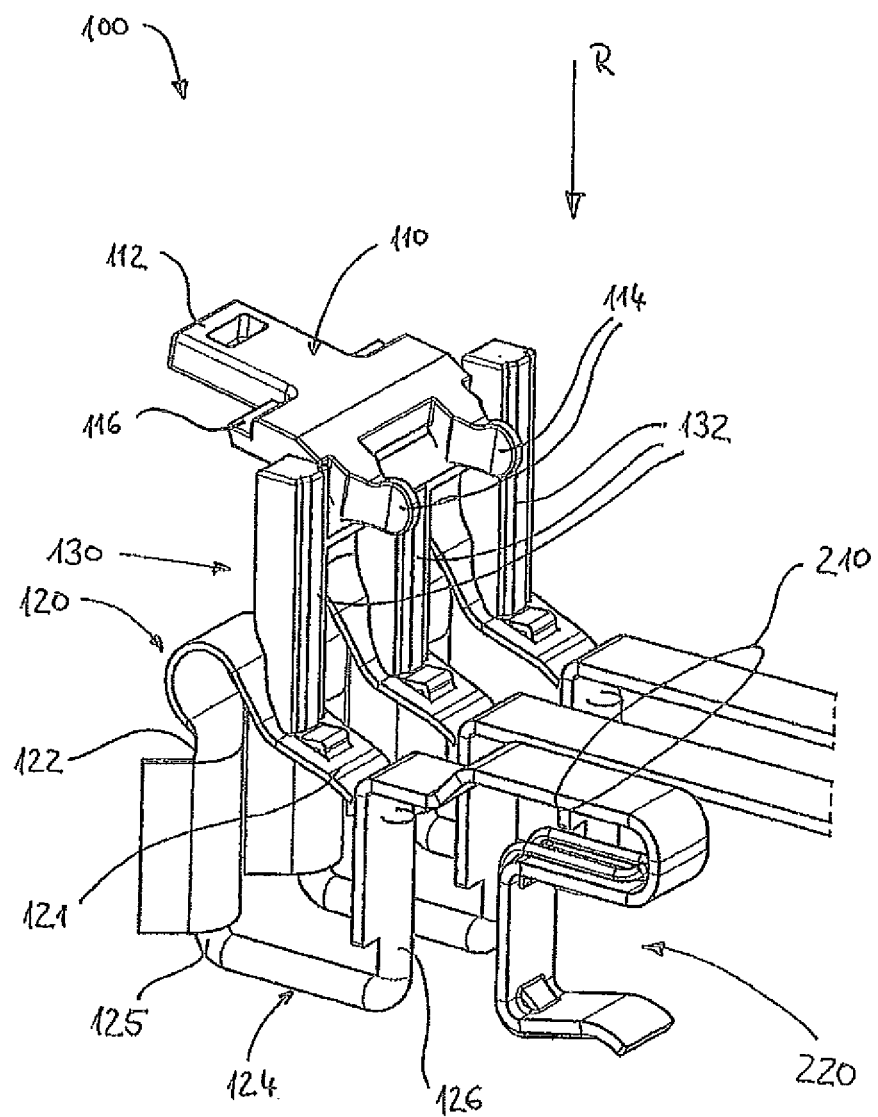
FIGS. 10A-10D perspective views of a cable connection arrangement of an embodiment of an adapter for busbars in an adapter system according to the invention.
Figure 10B:
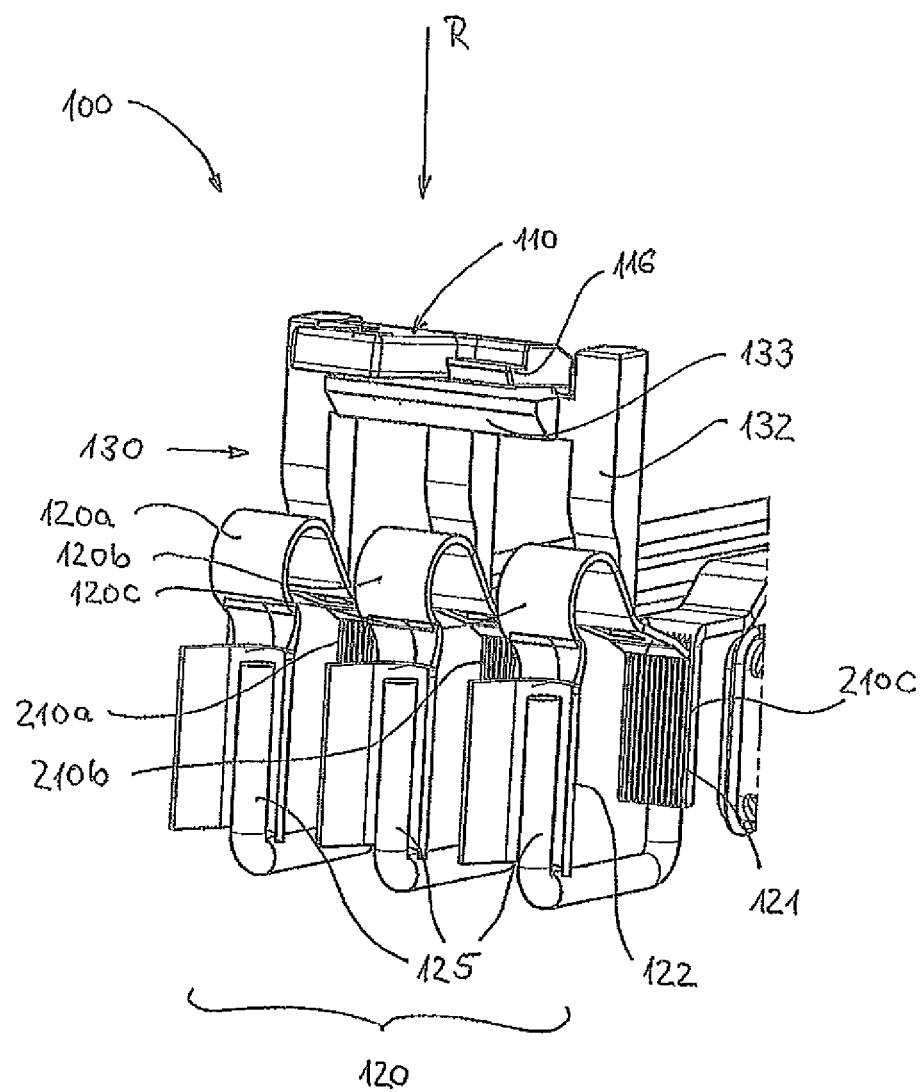
Figure 10C:
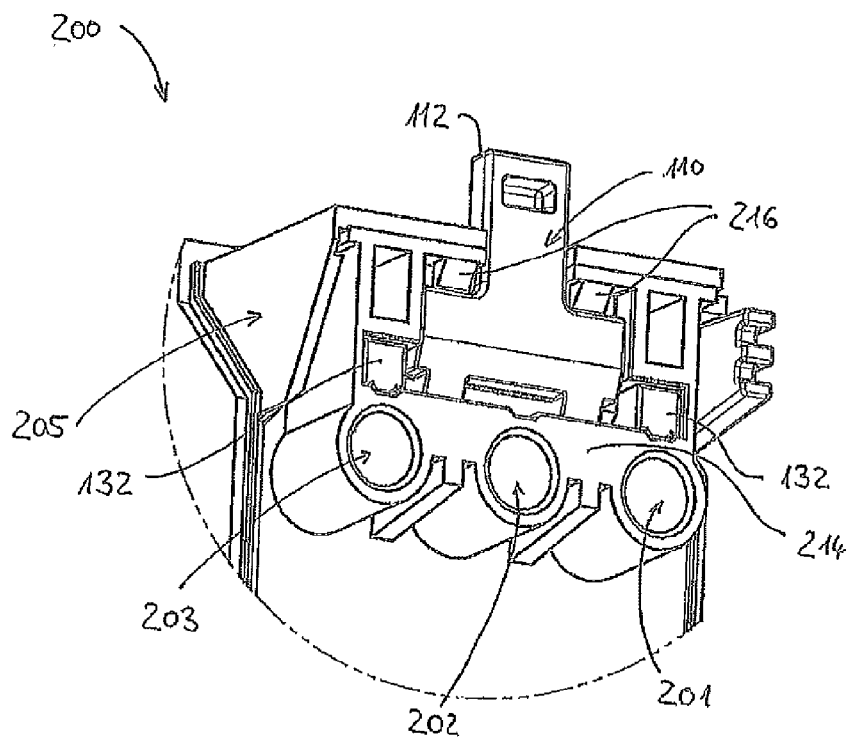
Figure 10:
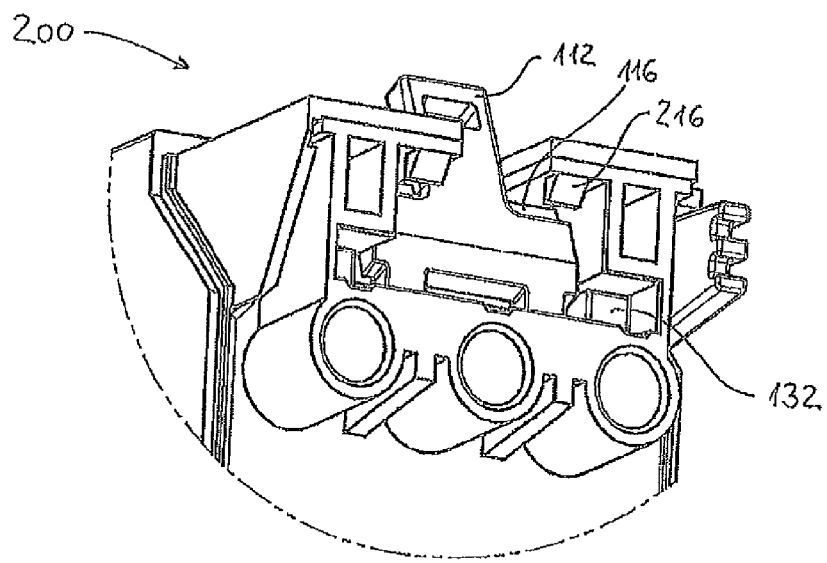

FIGS. 10A and 10D show a cable connection arrangement 100 that can be inserted in an adapter 200, and FIGS. 10C and 10D shown an enlarged excerpt from the adapter 200 with a cable connection arrangement 100 inserted.

The cable connection arrangement 100 has a lever switch 110, a connection structure 130 and in this exemplary embodiment, three spring clamps as a spring clamp structure 120. The lever switch 110 has a lever arm 112 and a brace structure or a brace section 114 opposite thereto, wherein between the lever arm 112 and the brace structure 114 a lever point P (which is hidden in the FIG.) contacts the connection structure 130. The brace section 114 serves for example as a pivot for the lever arm 112 so that when the lever switch 110 is actuated the brace section 114 rotates relative to a housing, but is not transversely displaced.

The connection structure 130 which is, for example, integrally constructed has, for example, three rod-shaped elements 132 (also referred to herein as brace rods or tappets) that extend in an insertion direction R (insertion direction) of the adapter-side connection device and that at one end opposite the lever point P contact one each of the three spring clamps 120. Each spring clamp 120 is connected to one U-shaped connection part (U-shaped contact connection) 124 respectively. The U-shaped connection part 124 has two facing members 125, 126, on one member 125 of which the spring clamp 120 is arranged and on the other member 126 in each case one end of a contact connection 210 for a busbar is fixed. The lever switch 110 and/or the connection structure 130 preferably comprise an electrically insulating material.

In accordance with one exemplary embodiment of the present invention the lever switch 110 comprises a step-shaped recess 116, which provides an upper abutment for a movement counter to the insertion direction R, so that the lever switch 110 can be held in the housing under tension by the spring force (see FIG. 10C)

The lever switch 110 shown is therefore designed to exploit a lever effect that arises along a lever arm, which is supported at a brace point (not shown in FIG. 10A) and generates a leverage at the lever point when the user applies a force to the end of the lever arm 112. As explained, with the present invention it is therefore possible for all contacts between the connection cable and the contact connections 210 to be produced and released simultaneously (or consecutively at short intervals) in any case in a single process step, with the result that no separate contacting of the individual conductors and/or poles is necessary. The user can therefore contact all conductors of the adapter-side connection device with the corresponding contact connections 210 in the adapter by means of a single activation of the lever switch 110 (as explained above about the activation lever and where appropriate the transmission element), and in a single process step can also disconnect all conductors of the adapter-side connection device from the contact connections 210 and therefore from the busbars. To do so does not require repeated process steps, but rather only a single actuation of the activation lever 480 and thereby the lever switch 110.

Each of the three spring clamps 120 can be implemented as a leaf spring with a spring arm 121 and provides a spring force that presses the spring arm 121 wholly or partially towards the other member 126 of the U-shaped connection part 124, in order thus to produce a contact when the adapter-side connection device is pushed in between the respective conductor of the connection cable and the respective contact connection 210 and the current rail. These three spring clamps 120 are opened simultaneously by a single actuation of the activation lever 480 and thereby the lever switch 110 (e.g. all spring arms 121 are simultaneously pushed in the insertion direction R via the rod-shaped elements 132).

In the exemplary embodiment, as shown in FIG. 10A, the cable connection arrangement 100 has a total of three contact connections 210 to the current rails, which are suitable for example for a three-phase current connection. The current rails can be contacted on a support 220 at an underside (in the insertion direction R) and are not shown in FIG. 10A. In addition, the leaf springs can also have two opposite facing spring arms 121, 122, that can be compressed together against the spring force. The compression can be caused for example by the exertion of a force on the lever arm 112 of the lever switch 110, wherein the force is relayed via the connection structure 130 (e.g. via the exemplary rod-shaped elements 132) onto the spring arm 121 in order to cause a bending of the spring arm 121 there when, for example, the user activates the activation lever 480 and thereby the lever switch 110.

The spring force of the spring clamps 120 is chosen to be sufficiently strong, for example, to prevent an autonomous release of the contact of the multi-pole connection cable between the spring arm 121 and the other member 126 of the U-shaped connection part 124 and to obtain a secure contact between the adapter-side connection device and the busbar adapter. Advantageously, the contact resists a tensile force that acts on the connection cable in the opposite direction to the insertion direction R, wherein the tolerable tensile force corresponds, for example, to a force that a user would apply if performing an unintentional extraction.

This can be obtained for example by the fact that on the surface of the spring arm 121, a structure is implemented that increases the friction between the spring arm 121 and the respective conductor or the respective pole of the adapter-side connection device. Optionally it is also possible for the cable to be damped by the spring arm 121 in the U-shaped connecting piece 124, which produces the connection to the contact connection 210, so that it cannot move contrary to an insertion direction R, or is only movable if the spring arm 121 is pushed away. Such a clamping causes a locking action. When withdrawing the conductor or pole from the adapter, in this exemplary embodiment it is first of all necessary for the spring arm 121 to be pushed in the insertion direction R in order to release the respective conductor.

FIG. 10B shows the cable connection arrangement 100 of FIG. 10A from an opposite side, so that the spring clamp structure 120 with altogether three spring clamps 120a, 120b, 120c, which are contacted by the rod-shaped elements 132, is visible. The rod-shaped elements 132 in this exemplary embodiment are connected together via a bridge 133, so that when the lever switch 110 or the lever arm 112 is activated the bridge 133 is pressed downward towards the spring clamps 120 (i.e. in the insertion direction R). In the activated condition of the lever switch 110 therefore the three spring clamps 120 shown are disconnected from a corresponding contact 210a, 210b, 210c of the contact connection 210 and therefore allow the introduction of the multi-pole adapter-side connection device in a single process step.

FIG. 10C shows an enlarged excerpt of an adapter 200 wherein the cable connection device 100 is inserted in an only partially visible housing 205 of the adapter 200. The housing 205 comprises three openings: a first opening 201, a second opening 202 and a third opening 203 into which a three-pole adapter-side connection device can be inserted. The housing 205 can have, for example, an upper deck and a lower deck, wherein in FIG. 10C the upper deck, has been removed and only the lower deck is visible.

The housing 205 has at least one projection 216 (or heel) on a front face of the housing 205, in order to provide an abutment for the lever switch 110. In addition, the lever switch 110 with the support structure 114, which is not visible in FIG. 10C, is braced by a support element 214 (or support structure), so that on account of the combination of the projection 216 and the support element 214, the lever arm 110 is retained in the housing 205 and can move and/or turn only in the insertion direction R. The projection 216 engages with the step-shaped recess 116 of the lever switch and blocks a vertical direction (against the spring tension).

The support element 214 and the projection 216 therefore form stop means, which define an abutment and a pivot for the brace section 114, so that the lever arm 112 is held in the housing 205 against the spring force by the projection 216 and by the support section 214, when for example the upper deck is removed (as shown in FIG. 10C). The lever switch 110 therefore assumes a null position on being released (or in the non-pressed condition), due to the spring force of the spring clamp structure 120, in which the adapter-side connection device with the at least two poles is held in the openings 201, 202, 203.

FIG. 10D shows the same subsection of the adapter 200 as can be seen, in FIG. 10C, wherein in FIG. 10D the lever switch 110 has been actuated so that the lever arm 112 in the view of FIG. 10D has moved downward (in the insertion direction R) and the step-shaped recess 116 on the lever switch 110 has released itself from the projection 216, and the connection structure 130 with the rod-shaped elements 132 have moved along the direction of motion of the lever arm 112 in the insertion direction R. During this lever movement the support element 214 serves as a support for the brace structure 114, so that the lever arm 112 forms a lever and at the leverage point P the leverage moves the connection structure 130 downwards.

FIGS. 11 to 14 relate to a further embodiment, wherein this embodiment of the invention relates in particular to a second aspect of the present invention. This embodiment is very similar to the embodiments described in FIGS. 1 to 10, so that for the avoidance of repetition reference is made to the above description, and furthermore similar or identical elements are labeled with the same reference numerals.

Figure 11:
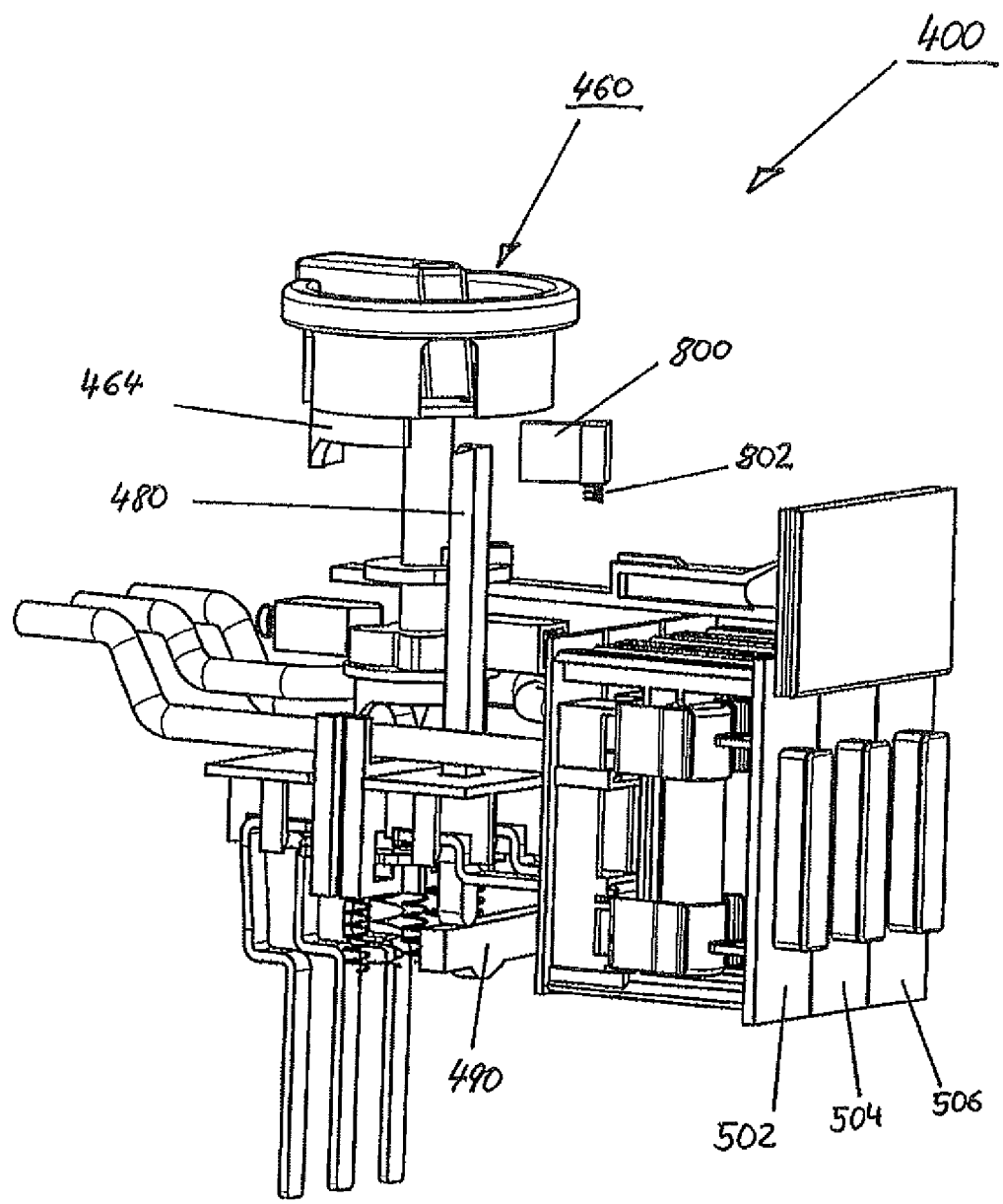
FIG. 11 a perspective view of some elements of an embodiment of an adapter connection module according to the invention in accordance with the second aspect of the invention, wherein the primary switch is in its on position.

FIG. 11 shows a perspective view of some important elements in accordance with an embodiment of an adapter connection module 400 according to the invention, that can be connected to an adapter (200, see FIGS. 1 to 10) for busbars, as was also described above.

In contrast to the embodiments shown, in FIGS. 1 to 10 the primary switch 460 additionally comprises an actuation cam 464, which in this embodiment is mounted directly on the primary switch 460, and which can be alternatively constructed integrally with a component of the primary switch 460 or with the primary switch 460 itself. The actuation cam can also constitute a separate component, that is directly or indirectly coupled to the primary switch or to a component of the primary switch, so that the actuation cam is brought into an assembled position when the primary switch is in its assembled position.

FIG. 11 additionally shows a locking device 800 with a locking spring 802. As explained above, in this embodiment the locking device 800 and the locking spring 802 are designed such that the locking spring 802 spring loads the locking device 800 in its locking position, wherein the locking device 800 in its locking position prevents the primary switch 460 from being moved from its off position into its assembled position.

FIG. 11 further shows the adapter connection module in which the primary switch 460 is in its on position. As is clearly visible in FIG. 11, the actuation cam 464 does not therefore act on the activation lever 480.

Figure 12:
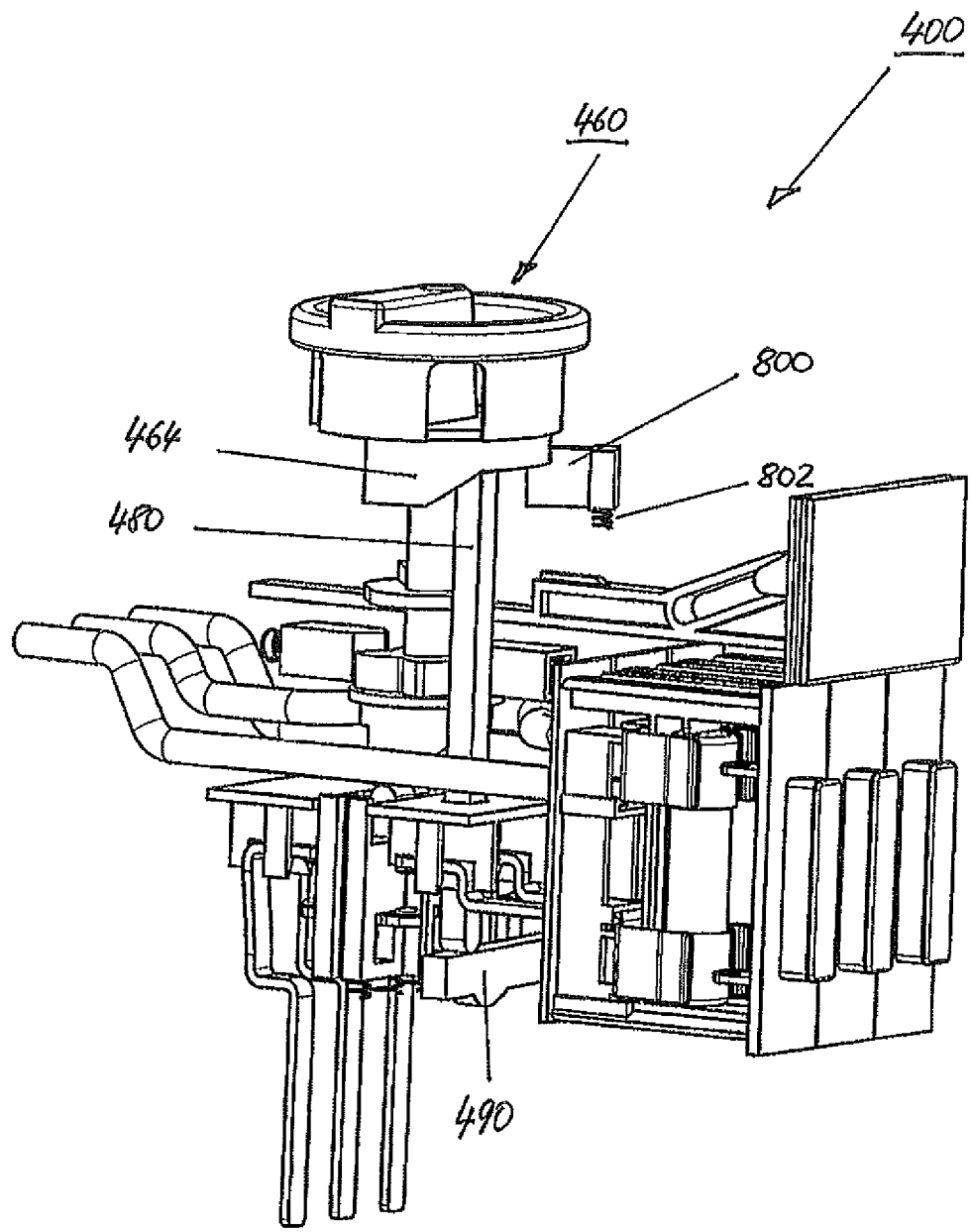
FIG. 12 a perspective view of some elements of an embodiment of an adapter connection module according to the invention in accordance with the second aspect of the invention, wherein the primary switch is in its off position.

In FIG. 12 the primary switch 460 has been moved into its off position wherein the activation lever 480 is located in an area of the actuation cam 464 that is designed such that the activation lever 480 is not or not yet forced into its activation position.

Figure 13:
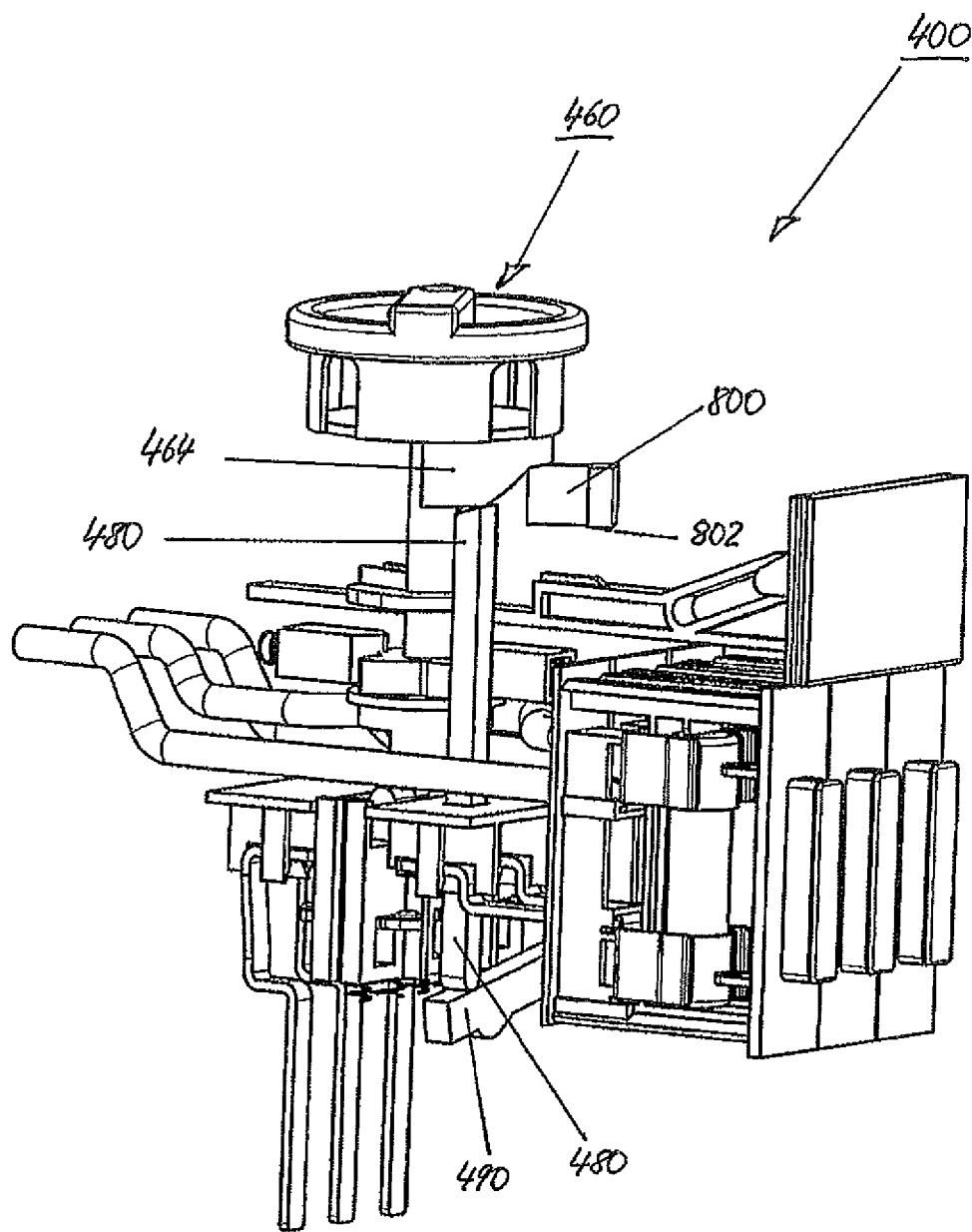
FIG. 13 a perspective view of some elements of an embodiment of an adapter connection module according to the invention in accordance with the second aspect of the invention, wherein the primary switch is in its assembled position.

Only when the primary switch 460 is moved into its assembled position, as shown in FIG. 13, is the activation lever 480 located in an area of the actuation cam 464 that is designed such that the activation lever 480 is forced into its assembled position.

This causes the activation lever 480 to press on the transmission element 490, which, as also described in connection with FIGS. 1 to 10, acts on the lever switch (110, see for example FIG. 7) in such a manner that this is pushed downwards when the adapter connection module 400 is arranged on the adapter for busbars.

As can also be seen in FIG. 12, the locking device 800, if it is in its locking position as shown in FIG. 12, prevents further twisting of the primary switch 460, because an element of the actuation cam 464 abuts against the locking device 800.

Only when the locking device 800 is pressed against the spring loading of the spring device 802 into its assembled position, downwards in FIG. 12, can the primary switch 460 be moved into its assembled position, as shown in FIG. 13.

Figure 14:
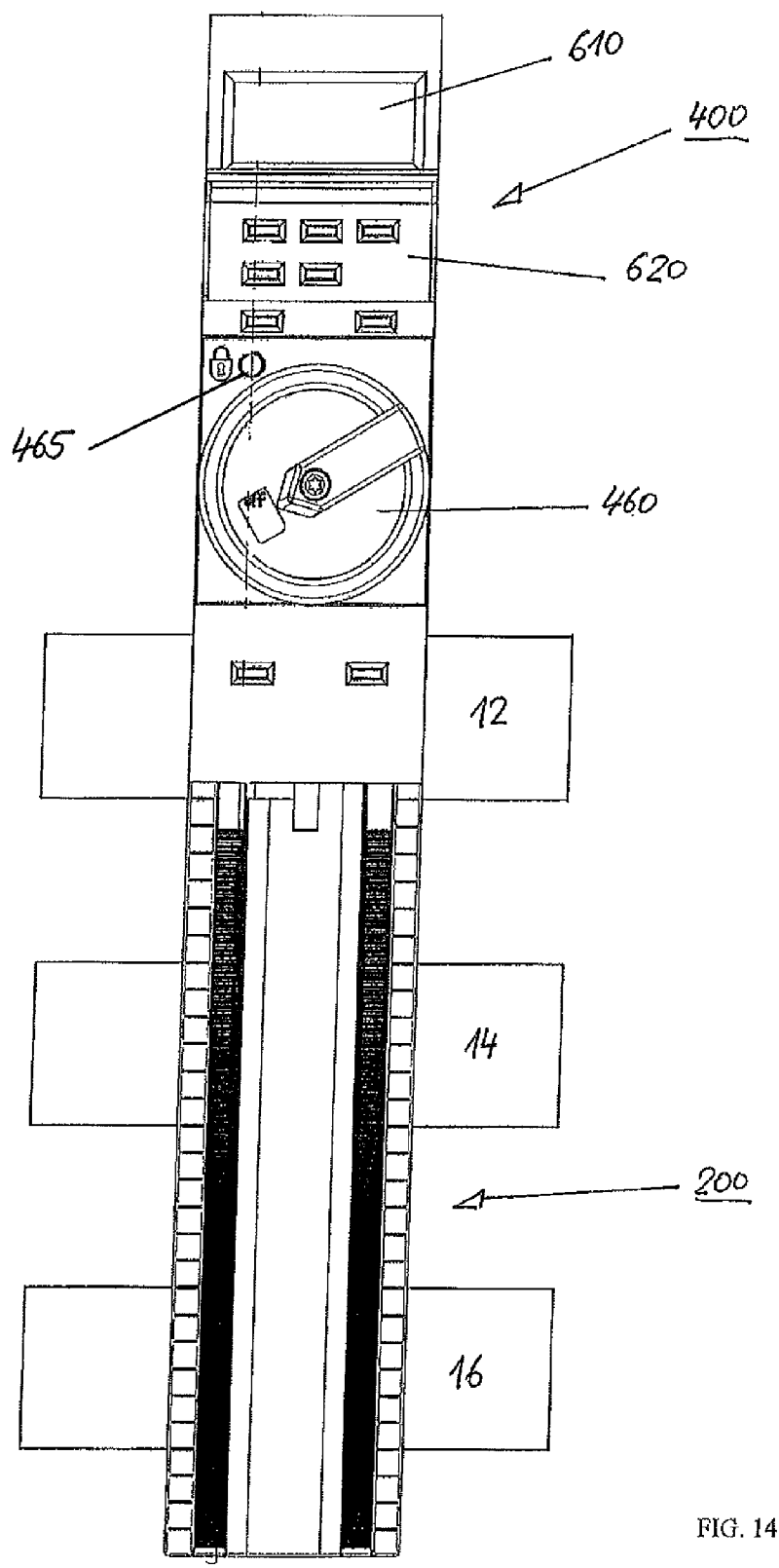
FIG. 14 a perspective view of an embodiment of an adapter connection module in accordance with the second aspect of the invention, wherein the primary switch is in its assembled position.

FIG. 14 shows a plan view of an embodiment of an adapter system in accordance with the second aspect of the invention, otherwise very comparable with FIG. 2, wherein the primary switch is shown in FIG. 14 in its assembled position.

In FIG. 14 an opening 465 is also very clearly seen, into which a tool can be introduced so that the locking device can be forced from its locking position into its assembled position, as described above.

With regard to the other features of the embodiment shown in FIGS. 11 to 14, reference is made to the description of FIGS. 1 to 10, in order to avoid repetition.

The features of the invention disclosed in the description, the claims and the drawings can be of significance both individually and in any desired combination for the implementation of the invention.

What is claimed is:

1. An adapter system for busbars, said adapter system comprising:
    an adapter (200) for busbars; and
    an adapter connection module (400) that (a) has an adapter-side connection device (410) which includes poles (401, 402, 403), (b) a housing (405) from which at least two of said poles (401, 402, 403) protrude, and (c) is configured to be connected with the adapter (200) for busbars to provide an operating position of the adapter system,
    wherein the adapter (200) for busbars has
    (a) at least two contact connections (210) for connecting the adapter (200) to a busbar system with at least two busbars (12, 14, 16),
    (b) a housing (205) having at least two openings (201, 202, 203) for each receiving a different one of said at least two poles (401, 402, 403) of said adapter-side connection device (410),
    (c) a cable connection arrangement (100) arranged in the housing (205) of the adapter (200) and having a spring clamp structure (120) and a lever switch (110) configured such that
        (i) the spring clamp structure (120) exerts a spring force that both spring-loads the lever switch (110) in an "on" position and exerts a force on said at least two poles (401, 402, 403) of said adapter-side connection device (410) inserted into the housing (205), such that said at least two poles (401, 402, 403) of said adapter-side connection device (410) cannot be extracted from the cable connection arrangement (100) when the lever switch (110) is in the "on" position, and (ii) the lever switch (110) is movable against the spring force exerted by the spring clamp structure (120) from the "on" position into an activation position, such that in the activation position of the lever switch (110) said at least two poles (401, 402, 403) of said adapter-side connection device (410) inserted into the housing (205) can be extracted from the cable connection arrangement (100), wherein (a) the housing (405) has at least two pole consumer-side connection devices (420) for connecting an electrical consumer, wherein the adapter-side connection device (410) is connected via an interruptible bridge circuit (440) to the consumer-side connection devices (420), (b) said adapter connection module (400) has a primary switch (460) configured to be toggled between an "on" position and an "off" position, (c) said adapter connection module (400) has an activation lever (480) for actuating the lever switch (110) of the adapter (200) for busbars, wherein the activation lever (480) is movable between an operating position and an activation position, wherein the bridge circuit (440) is in an "on" position when the primary switch (460) is in the "on" position, and wherein the bridge circuit (440) is in an interrupted condition when the primary switch (460) is in the "off" position, and wherein the primary switch (460) has an opening (462) configured such that (i) the activation lever (480) of the adapter connection module (400) can be forced into the activation position by a tool introduced through the opening (462) of the primary switch (460) into the housing (405) of the adapter connection module (400) when the primary switch (460) is in the "off" position, and (ii) the opening (462) of the primary switch (460) is closed off by the adapter connection module (400) when the primary switch (460) is in the "on" position.

2. The adapter system according to claim 1, wherein one of the primary switch (460) and a component (466) of the primary switch (460) can be rotated through a pre-specified angle between the "on" position and "off" position.

3. The adapter system according to claim 1, wherein the activation lever (480) of the adapter connection module (400) is movable in the longitudinal direction over a pre-specified distance between the activation position and the operating position.

4. The adapter system according to claim 1, wherein the adapter connection module (400) further comprises one fuse holder per pole for receiving fuses (510), wherein the fuse holders (502, 504, 506) are movable between an operating position and a removal position in which the fuse (510) can be removed from the fuse holder (502, 504, 506) by the user.

5. The adapter system according to claim 4, wherein the adapter connection module (400) further comprises a locking device (520) for the fuse holders (502, 504, 506), which is coupled to the primary switch (460) such that when the primary switch (460) is in the "on" position, then the locking device (520) prevents movement of any fuse holder (502, 504, 506) out of the operating position towards the removal position.

6. The adapter system according to claim 5, wherein the primary switch (460) and the locking device (520) are one of directly and indirectly coupled such that a rotation of the primary switch (460) is transformed into a linear movement of the locking device (520).

7. The adapter system according to claim 1 further comprising a movable control element (466) of the primary switch (460) that is movable between an "on" position and an "off" position, the movable control element (466) has openings that, in at least one of the "on" position and the "off" position, are aligned with corresponding openings of other elements (468) in one of the primary switch (460) and the adapter connection module (400) such that a locking device (610) can be guided through the openings and the primary switch (460) can be locked in at least one of the "on" position and the "off" position.

8. The adapter system according to claim 1, wherein the adapter connection module (400) further comprises a transmission element (490) that is rotatably fixed to a part of the adapter connection module (400), wherein the activation lever (480) and the transmission element (490) are arranged such that the activation lever (480) forces the transmission element (490) into an activation position when the activation element (480) is in the activation position, such that the activation element (480) indirectly forces the lever switch (110) of the adapter (200) for busbars into the activation position via the transmission element (490).

9. The adapter system according to claim 8, wherein the transmission element (490) is configured to be maximally rotated through a pre-specified angle.

10. The adapter system according to claim 1, wherein the adapter connection module (400) further comprises at least one measurement device (920) for measuring an operating parameter of at least one of the adapter system, a microprocessor, and an electronic power supply.

11. The adapter system according to claim 1, wherein the adapter connection module (400) further comprises at least one of a display device (610) and a control panel (620) for the user.

12. An adapter system for busbars, said adapter system comprising:
an adapter (200) for busbars; and
an adapter connection module (400) that (a) has an adapter-side connection device (410) which includes poles (401, 402, 403), (b) a housing (405) from which at least two of said poles (401, 402, 403) protrude, and (c) is configured to be connected to the adapter (200) for busbars to provide an operating position of the adapter system,
wherein the adapter (200) for busbars has
(a) at least two contact connections (210) for connecting the adapter (200) to a busbar system with at least two busbars (12, 14, 16),
(b) a housing (205) having at least two openings (201, 202, 203) for each receiving a different one of said at least two poles (401, 402, 403) of said adapter-side connection device (410),
(c) a cable connection arrangement (100) arranged in the housing (205) of the adapter (200) and having a spring clamp structure (120) and a lever switch (110) configured such that
(i) the spring clamp structure (120) exerts a spring force that both spring-loads the lever switch (110) in an "on" position and exerts a force on said at least two poles (401, 402, 403) of said adapter-side connection device (410) inserted into the housing (205) such that said at least two poles (401, 402, 403) of said adapter-side connection device (410) cannot be extracted from the cable connection arrangement (100) when the lever switch (110) is in the "on" position, and (ii) the lever switch (110) is movable against the spring force exerted by the spring clamp structure (120) from the "on" position into an activation position, such that in the activation position of the lever switch (110) said at least two poles (401, 402, 403) of said adapter-side connection device (410) inserted into the housing (205) can be extracted from the cable connection arrangement (100), wherein (a) the housing (405) has at least two pole consumer-side connection devices (420) for connecting an electrical consumer, wherein the adapter-side connection device (410) is connected via an interruptible bridge circuit (440) to the consumer-side connection devices (420), (b) said adapter connection module (400) has a primary switch (460) configured to be toggled between an "on" position and an "off" position, (c) said adapter connection module (400) has an activation lever (480) for actuating the lever switch (110) of the adapter (200) for busbars, wherein the activation lever (480) is movable between an operating position and an activation position, wherein the bridge circuit (440) is in an "on" position when the primary switch (460) is in the "on" position, and wherein the bridge circuit (440) is in an interrupted condition when the primary switch (460) is in the "off" position, wherein the primary switch (460) is furthermore configured to have an assembled position and is switchable back and forth between the "off" position and the assembled position, and wherein the adapter connection module (400) and the primary switch (460) are configured such that when the primary switch (460) is in the assembled position, then the activation lever (480) of the adapter connection module (400) is forced directly or indirectly into the activation position.

13. The adapter system according to claim 12, wherein one of the primary switch (460) and the component (466) of the primary switch (460) can be rotated through a pre-specified angle between the "off" position and the assembled position.

14. The adapter system according to claim 12, wherein one of the primary switch (460) and a component of the primary switch (460) comprises an actuation cam (464) configured to force the activation lever (480) of the adapter connection module (400) into the activation position when the primary switch (460) is in the assembled position.

15. The adapter system according to claim 12, wherein the adapter connection module (400) further comprises a locking device (800) that can be moved from a locking position into said assembled position, wherein the adapter connection module (400), the primary switch (460) and the locking device (800) are configured such that the primary switch (460) cannot be moved from the "off" position into the assembled position when the locking device (800) is in the locking position.

16. The adapter system according to claim 15, wherein the locking device (800) comprises a spring device that spring-loads the locking device (800) into the locking position.

17. The adapter system according to claim 15, wherein at least one of the primary switch (460) and the adapter connection module (400) has an opening (465) arranged such that the locking device (800) can be forced into the assembled position by a tool introduced through the opening (465) when the primary switch (460) is in the "off" position.

* * * * *